May 28, 1940.
B. D. BEDFORD
2,202,727
ELECTRIC VALVE CIRCUIT
Filed Oct. 19, 1937
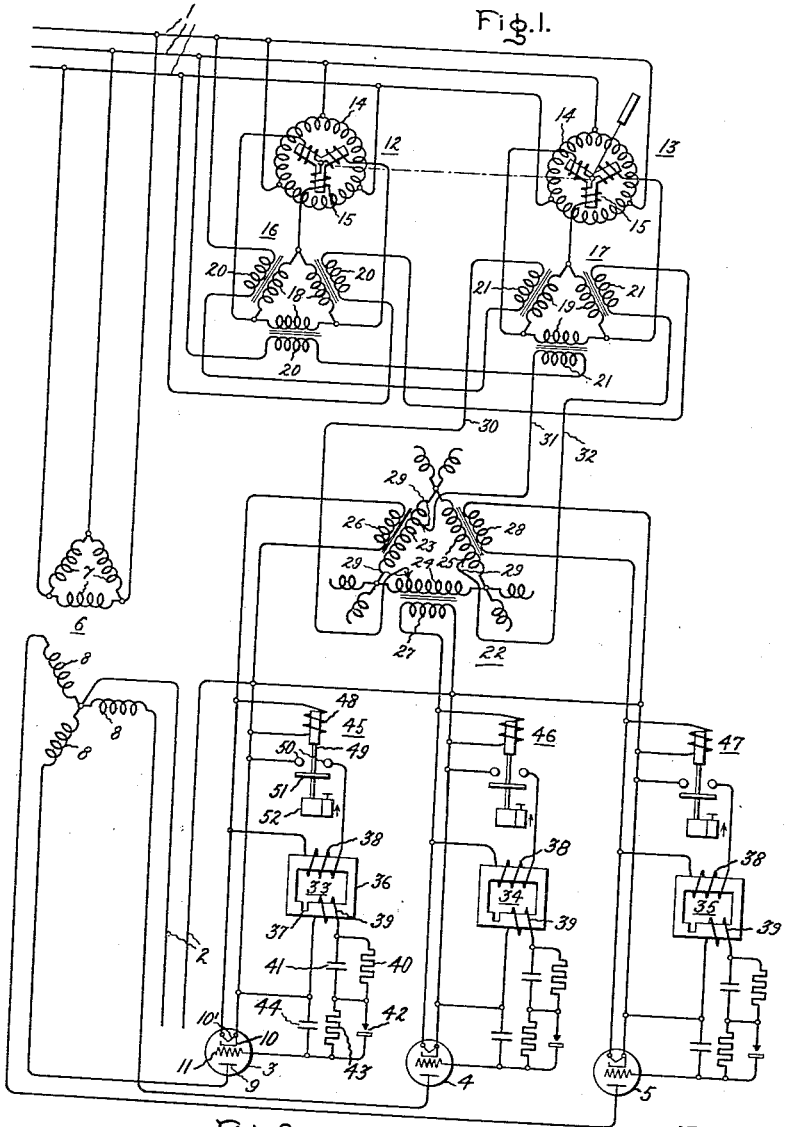
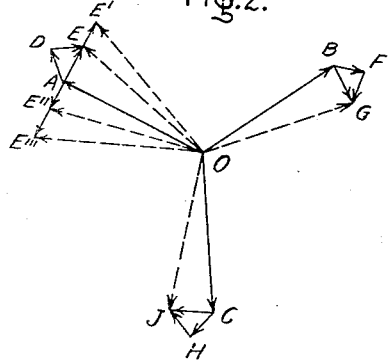
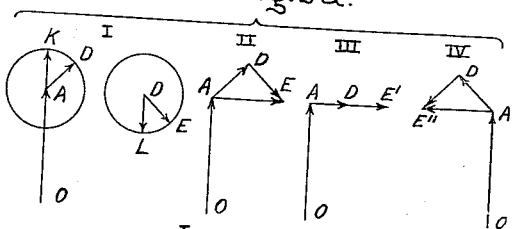
Inventor:
Burnice D. Bedford,
by Harry E. Dunham
His Attorney.

Patented May 28, 1940

2,202,727

UNITED STATES PATENT OFFICE 2,202,727

ELECTRIC VALVE CIRCUIT

Burnice D. Bedford, Schenectady, N. Y., assignor to General Electric Company, a corporation of New York Application October 19, 1937, Serial No. 169,834

6 Claims. (Cl. 250—27)

My invention relates to electric valve circuits, and more particularly to control or excitation circuits for electric valve apparatus.

It is often desirable to control or regulate the phase of the voltage impressed on the control members of electric valves. For example, in the control of electric valve apparatus employing ionizable mediums, such as gases or vapors, it has been found that highly satisfactory control of the apparatus is obtained by impressing on the control members alternating voltages which are controllable in phase relative to the voltages impressed on the associated anodes. Heretofore, there have been proposed numerous arrangements for effecting this control, as for example, phase shifting circuits of the static type, and phase shifting circuits of the rotary type, such as induction devices including relatively movable windings. Where arrangements of the latter type have been used in power installations it has been found that the size, rating and cost of the equipment become excessively large as compared with the size, rating and cost of the electric valve apparatus which is controlled. In view of these factors there has been evidenced a decided need for improved control circuits for electric valve apparatus which permit reductions in the size and the rating of the phase shifting apparatus, without sacrificing the desired flexibility and precision of control.

It is an object of my invention to provide a new and improved electric valve circuit.

It is another object of my invention to provide a new and improved control or excitation circuit for electric valve apparatus.

It is a further object of my invention to provide a new and improved phase shifting circuit for electric valve apparatus whereby there is effected a material saving in equipment and a substantial improvement in apparatus economy.

In accordance with the illustrated embodiment of my invention, I provide a new and improved excitation circuit for electric valve apparatus, and in which the voltage impressed on a control member of the electric valve apparatus may be varied or controlled in phase to obtain a desired output characteristic of the electric valve apparatus. More specifically, the excitation circuit controls the phase of the voltage impressed on the control member relative to the voltage impressed on the associated anode and includes a pair of phase shifting devices of the induction type having primary or inducing windings thereof connected to be energized from a polyphase alternating current circuit and having rotatable secondary or induced windings connected in series relation to produce a pair of variable phase angle voltages having a resultant voltage of variable magnitude, but of fixed phase position relative to a predetermined voltage of the alternating current circuit. The excitation circuit includes an inductive network such as a transformer which is energized from the alternating current circuit and which serves to produce a voltage which is variable in phase but which is substantially constant in magnitude by combining an alternating voltage with the resultant output voltage of the pair of phase shifting devices. The secondary windings of the phase shifting devices are mechanically coupled and may be arranged to produce the resultant voltage of variable magnitude which is in quadrature with the alternating voltage of the associated phase of the polyphase alternating current circuit.

In accordance with another feature of the illustrated embodiment of my invention I provide an improved control or excitation circuit for electric valve apparatus, in which the cathode heating element and the control member of an electric valve are both energized from a single inductive network. The voltage impressed on the inductive network and hence the voltage impressed on the control member is variable in phase, serving to control the conductivity of the electric valve means without interfering with the supply of the requisite amount of energy to the cathode heating element.

For a better understanding of my invention reference may be had to the following description taken in connection with the accompanying drawing, and its scope will be pointed out in the appended claims.

Fig. 1 of the accompanying drawing diagrammatically illustrates an embodiment of my invention as applied to an electric valve circuit for transmitting energy between an alternating current circuit and a direct current circuit, and Figs. 2 and 2a represent certain operating characteristics thereof.

In Fig. 1 of the accompanying drawing I have diagrammatically illustrated my invention as applied to an electric valve system for transmitting energy between a polyphase alternating current circuit 1 and a direct current circuit 2 through electric valve means 3, 4 and 5 and through a transformer 6 having primary windings 7 and secondary windings 8. The electric valve means 3, 4 and 5 are preferably of the type employing an ionizable medium such as a gas or vapor, and each includes an anode 9, a cathode 10, a cathode heating element 10' and a control member 11.

I provide a control system including a plurality of excitation circuits for energizing the control members 11 of electric valves 3, 4 and 5, and which impress on the control members 11 alternating voltages variable in phase to control the conductivities of the electric valves and hence control the transfer of energy between the alternating current circuit 1 and the direct current circuit 2. The control or excitation system includes a pair of phase shifting devices 12 and 13 of the induction type, each having a primary or inducing winding 14 and rotatable secondary or induced windings 15. Each of the polyphase phase shifting devices 12 and 13 consists essentially of axially aligned, relatively rotatable, inductively related, distributed polyphase primary and secondary windings connected respectively (directly or indirectly) across and in a polyphase circuit which controls the energization of control members 11 of electric valves 3, 4 and 5. The voltage induced in the secondary windings 15, by the primary windings 14, is caused by the rotating magnetic fields produced by the primary windings. The result is that the magnitude of the voltage induced in the secondary winding is constant regardless of the angular position of a secondary winding with respect to the primary winding, and only the phase of the induced secondary voltage with respect to the primary voltage is varied by rotating the windings with respect to each other. Thus, each of the induction devices 12 and 13 introduces in the system a constant magnitude voltage which is variable in phase. The resultant of these two voltages may be varied in both magnitude and phase by simply varying the phase of the respective output voltages which constitute its components. The secondary windings 15 may be coupled to rotate in the same mechanical direction, in which case the rotating magnetic fields of the respective devices must be arranged to rotate in opposite directions. In the arrangement shown in Fig. 1 primary windings 14 of devices 12 and 13 are connected to the alternating current circuit 1 so that the magnetic fields thereof rotate in opposite directions and the secondary windings 15 are coupled so that the mechanical rotation of these windings is in the same direction. Of course, the primary windings 14 may be connected to the alternating current circuit 1 so that the magnetic fields rotate in the same direction, in which case the secondary windings 15 must be arranged to rotate in opposite directions. This reverse direction of rotation may be obtained by using any conventional arrangement such as suitable mechanical gears. Furthermore, it is to be understood that the secondary windings 15 of the induction devices 12 and 13 may be either manually or automatically operated.

As an agency for combining or adding the output voltages of the secondary windings 15 of induction devices 12 and 13, I provide suitable inductive networks such as transformers 16 and 17 having primary windings 18 and 19, and secondary windings 20 and 21 respectively. The primary windings 18 and 19 of transformers 16 and 17 are connected to be energized in accordance with the output voltages of the induction devices 12 and 13 respectively, and corresponding secondary windings of the respective phases thereof are connected in series relation with respect to each other to obtain a resultant control voltage. For example, the left-hand secondary winding 20 of transformer 16 is connected in series relation with the left-hand secondary winding of transformer 17. It will be noted that the secondary windings 21 of transformer 17 are reversed relative to the secondary windings 20 of transformer 16. This connection is necessary to maintain the proper phase relation of the voltages which are impressed on an inductive network 22. The inductive network 22 may comprise a polyphase transformer having primary windings 23, 24, and 25 and secondary windings 26, 27 and 28. The primary windings 23, 24 and 25 may be provided with suitable voltage adjusting means such as adjustable contacts 29, and may also be provided with suitable winding extensions to afford a greater range of voltage magnitude control. The adjustable contacts 29 are connected to the alternating current circuit 1 through secondary windings 20 and 21 of transformers 16 and 17, respectively, and through conductors 30, 31 and 32. The resultant voltage impressed on primary windings 23–25 of the inductive network 22 is the resultant of the voltage derived from the alternating current circuit 1 and the sum of the output voltages of induction devices 12 and 13 and transformers 16 and 17. By adjusting the angular positions of the secondary windings 15 of the induction devices 12 and 13, the phase of the alternating voltages impressed on primary windings 23–25 may be controlled, and in this manner the phase of the alternating voltages induced in secondary windings 26–28 will also be controlled.

The inductive network 22 serves as a highly satisfactory insulating arrangement where it is desired to transmit energy at relatively high voltages. In such arrangements it is highly desirable to provide adequate insulation between the power electric valves 3, 4 and 5 and the control circuit to permit adjustment of the voltage impressed on the control members.

The rating of the induction devices 12 and 13 is substantially less than the rating of the inductive network 22 providing thereby a material saving of apparatus and an improvement in apparatus economy, since the induction devices 12 and 13 may be proportioned to afford the desired or requisite phase shifting control voltage by supplying only a relatively small component of the total control voltage which is impressed on the control members.

It is to be understood that the inductive network 22 serves a dual purpose, that is, it effects energization of the heating elements 10' for cathodes 10 and serves to provide an alternating voltage variable in phase for controlling the conductivities of electric valves 3, 4 and 5. In order to impress on the control members 11 of the electric valves 3, 4 and 5 an alternating voltage of peaked wave form, I employ a plurality of saturable inductive devices 33, 34 and 35, each including a core member 36 having a restricted saturable portion 37, a primary exciting winding 38, and a secondary winding 39 in which there is induced an alternating voltage of peaked wave form. Considering in particular the circuit for energizing control member 11 of electric valve 3, a parallel connected resistance 40 and a capacitance 41 are employed as a self-biasing circuit to impress on the control member 11 a negative unidirectional biasing potential. A suitable unidirectional conducting device 42 is connected in series with the parallel connected resistance 40 and capacitance 41 to impress on control member 11 only the positive impulses of peak voltage generated by the saturable device 33 and a resistance 43 is connected in shunt with the unidirectional conducting device 42 to provide a non-inductive path for the flow of normal control current in the event the unidirectional conducting device 42 becomes inoperative. A capacitance 44 is connected across the cathode 10 and control member 11 to absorb extraneous transient voltages which may be present in the control circuit.

As an arrangement for delaying the energization of control members 11 of electric valves 3, 4 and 5 for a predetermined time to permit the cathodes 10 thereof to attain a predetermined operating temperature, I employ time delay relays 45, 46 and 47. Each of the relays 45–47 includes an actuating coil 48, an armature 49, stationary contacts 50 and a bridging member 51. The time delay feature is obtained by employing a suitable device such as a dash-pot 52.

The operation of the embodiment of my invention shown in Fig. 1 will be explained when the system is operating to transmit energy from the alternating current circuit 1 to the direct current circuit 2 through electric valves 3, 4 and 5 and transformer 6. As will be well understood by those skilled in the art, the conductivities of the electric valves and hence the energy transmitted between circuits 1 and 2 may be controlled by controlling the phase of the alternating voltages impressed on control members 11. When there is substantial phase coincidence between the voltages impressed on the control members 11 and the respective associated anodes 9, the energy transmitted by the electric valve will be maximum, and when there is substantial phase opposition between these voltages the energy transmitted will be substantially zero. For intermediate phase displacements the energy transmitted will assume corresponding intermediate values.

By the proper adjustment of the angular position of secondary windings 15 of induction devices 12 and 13, the phase of the alternating voltages impressed on control members 11 may be controlled to control the transfer of energy between circuit 1 and circuit 2. The output voltages of induction devices 12 and 13, which may be represented as variable phase angle vectors, are combined by means of transformers 16 and 17 to produce a resultant voltage which is added vectorially to voltages derived from the alternating current circuit 1 to impress on the control members 11 an alternating voltage variable in phase but being of substantially constant magnitude.

Figs. 2 and 2a may be considered to facilitate the explanation of the operation of the arrangement shown in Fig. 1. Considering Fig. 2 in particular, the vectors OA, OB and OC represent the three phase system of voltages of the alternating current circuit 1 and the vectors AD, BF and CH represent the output voltages of the induction device 12 and transformer 16, while vectors DE, FG and HJ represent the output voltages of the induction device 13 and associated transformer 17. The sum of the respective associated vectors, that is, vectors OE, OG and OJ represent the voltages impressed on the inductive network 22 by conductors 30–32. It is also to be understood that the last-named vectors also represent the voltages impressed on primary windings 38 of saturable inductive devices 33–35 and hence represent the relative angular positions of the alternating voltages of peak wave form impressed on control members 11 of electric valves 3, 4 and 5. Considering more particularly the vectors representing the voltage impressed on the control member 11 of electric valve 3, it is to be understood that by controlling the angular position of secondary windings 15 of induction devices 12 and 13, the voltages impressed on control members 11 may be made to assume the position corresponding to vectors OE, OE'' and OE'''.

By properly positioning the secondary windings 15 of induction devices 12 and 13 so that at combined zero output voltage the respective voltages are in phase opposition with respect to each other and one of them is in phase with the voltage vector of the associated phase of the alternating current circuit, the system may be arranged so that the combined output voltages thereof, as represented by vectors AE, BG and CJ, are always perpendicular to the voltages derived from circuit 1. This combined output voltage, while being fixed in phase, varies in magnitude to control the resultant voltage impressed on control members 11. This resultant voltage, as represented by vectors OE, OG and OJ, varies appreciably in phase angle but varies inappreciably in magnitude. The vector diagrams of Fig. 2a represent the manner in which the combined voltage outputs of induction devices 12 and 13 produce a voltage which is perpendicular to the voltage vector of the associated phase of the alternating current circuit 1. In Diagram I, the vectors AK and DL represent the relative phase positions of the output voltages of the induction devices 12 and 13 when the combined voltage output is zero. In Diagram II, the vector sum of the output voltages of induction devices 12 and 13 is represented by the vector AE which is perpendicular to vector OA. The vector diagram of Diagram III represents the combined output voltage of induction devices 12 and 13 when the respective output voltages thereof are in phase, and the vector AE'' of Diagram IV represents the output voltage when the secondary windings 15 of induction devices 12 and 13 have been moved in an opposite direction from that shown in Diagrams II and III to reverse the phase of the resultant combined output voltage. It is noted that under all conditions the vector sum of the combined output voltage of devices 12 and 13, with the exception of the condition when the respective voltages are in phase opposition represented in Diagram I is perpendicular to the vector OA. Furthermore, it is to be noted that the magnitude of the combined output voltage varies so that the voltages impressed on control members 11 of electric valves 3, 4 and 5 represented by vectors OE, OG and OJ in Fig. 2 vary in phase position but do not vary appreciably in magnitude.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an electric valve means having a control member, and an excitation circuit for energizing said control member comprising a source of alternating voltage, a pair of induction devices each having relatively movable primary and secondary windings, said secondary windings being connected to produce respectively a pair of variable phase angle voltages having a vector resultant, means for operating said devices in a manner to vary the magnitude of said resultant while maintaining its phase position fixed, and means responsive to said alternating voltage and said resultant for impressing on said control member a voltage variable in phase.

2. In combination, an electric valve means having a control member, and an excitation circuit for energizing said control member comprising a source of alternating voltage, a pair of induction devices each having relatively movable primary and secondary windings, said secondary windings being connected to produce respectively a pair of variable phase angle voltages having a vector resultant, means for simultaneously operating said devices in a manner to vary the magnitude of said resultant while maintaining its position in quadrature with the voltage of said source, and means responsive to said alternating voltage and said resultant for impressing on said control member a voltage variable in phase and of substantially constant magnitude.

3. In combination, an electric valve means having a control member, a polyphase alternating current circuit, a pair of polyphase induction devices each including relatively movable primary and secondary windings, said secondary windings being mechanically coupled and being connected to produce respectively a pair of variable phase angle voltages having a vector resultant, means for simultaneously rotating said secondary windings to vary the magnitude of said resultant while maintaining its phase position in quadrature with respect to the voltage of said source, and means responsive to the vector sum of said resultant and said alternating voltage for impressing on said control member an alternating voltage variable in phase and of substantially constant magnitude.

4. In combination, an electric valve means having an anode, a cathode, a heating element for said cathode and a control member, a source of alternating voltage, means energized from said source for producing a control voltage variable in magnitude, and means responsive to a resultant of the voltage of said source and said control voltage for impressing on said control member an alternating voltage variable in phase and of substantially constant magnitude, said heating element being energized from said last-mentioned means.

5. In combination, an electric valve means having an anode, a cathode, a heating element for said cathode and a control member, a source of alternating current, means for producing an alternating control voltage of variable magnitude and having a fixed phase relation with respect to the voltage of said source, means responsive to said control voltage and a component of voltage derived from said source for impressing on said control member an alternating voltage variable in phase and of substantially constant magnitude, said cathode heating element being energized from said last-mentioned means, and means for delaying the energization of said control member for a predetermined time after the initiation of the energization of the cathode heating element.

6. In combination, an electric valve means having a control member, and an excitation circuit for energizing said control member comprising a source of alternating voltage, a pair of induction devices each having relatively movable primary and secondary windings, said secondary windings being connected to produce respectively a pair of variable phase angle voltages having a vector resultant, means for operating said devices in a manner to vary the magnitude of said resultant while maintaining its phase position fixed, means responsive to said alternating voltage and said resultant for impressing on said control member a voltage variable in phase and means associated with said last-mentioned means for controlling the output voltage thereof.

BURNICE D. BEDFORD.